Nov. 18, 1947.    G. A. J. G. BOURDELAIS    2,431,021
THREAD CHECKING COMPARATOR GAUGE
Filed April 10, 1943    3 Sheets-Sheet 3
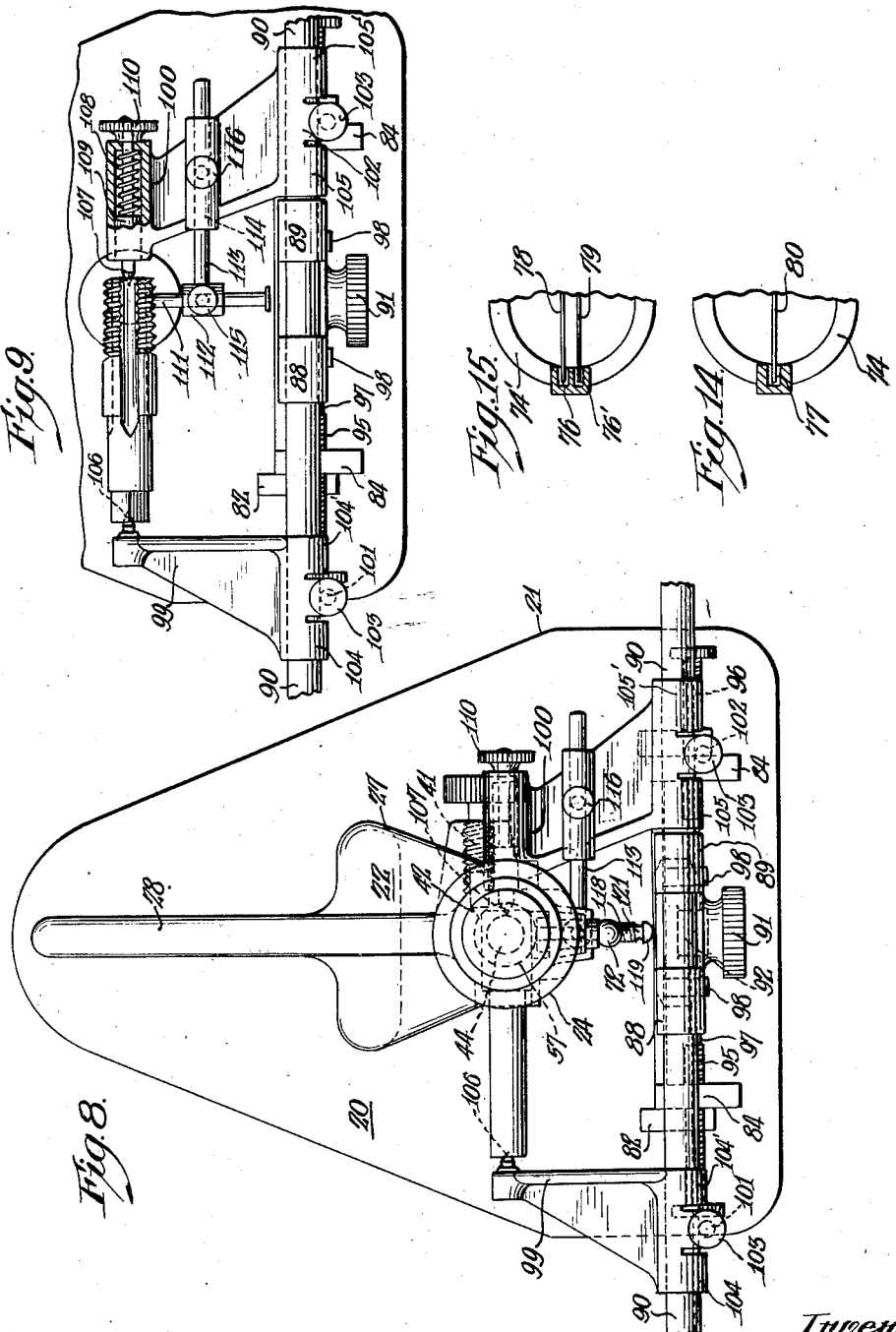
Inventor
George A.J.G. Bourdelais Sr.

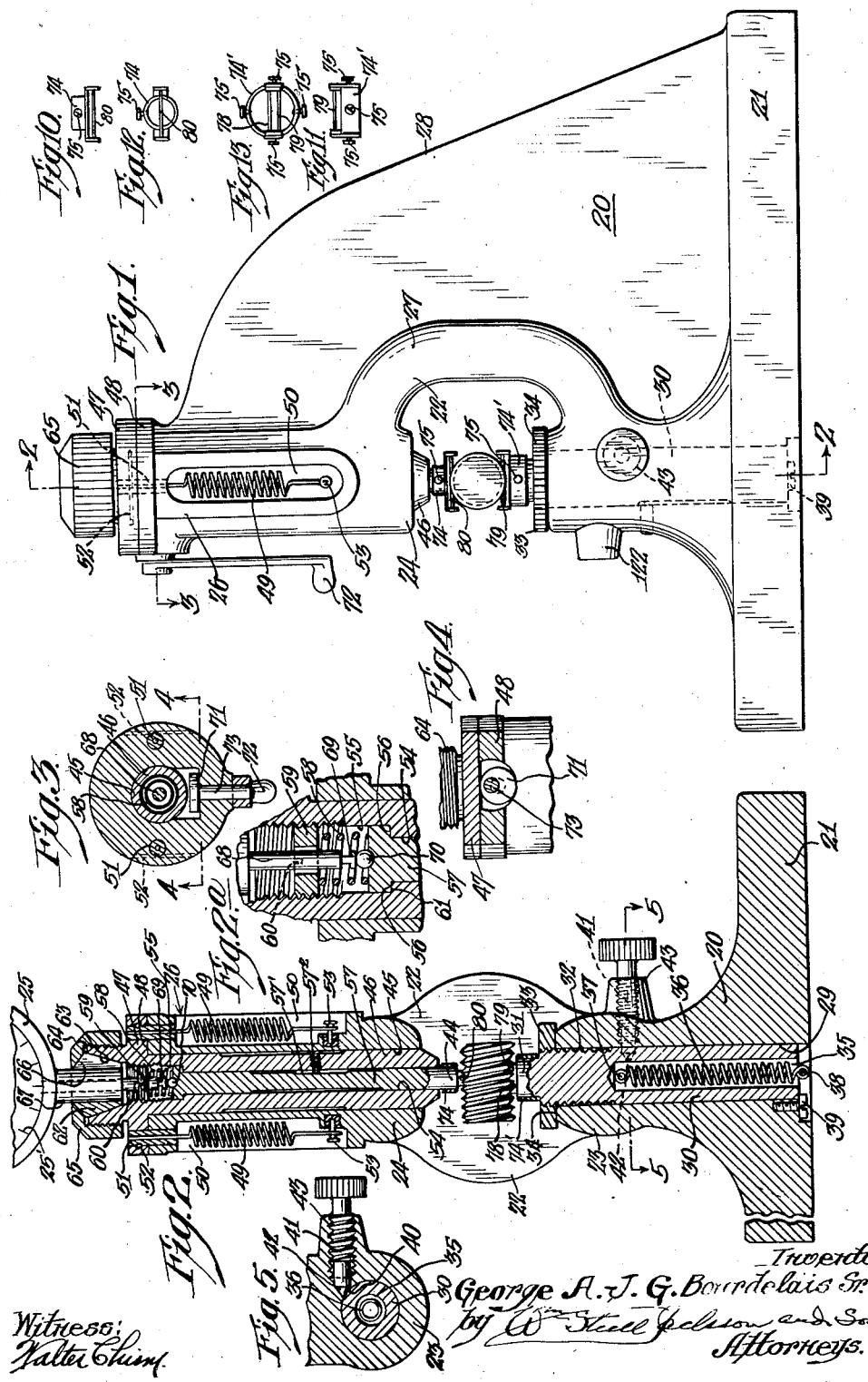

Patented Nov. 18, 1947

2,431,021

UNITED STATES PATENT OFFICE 2,431,021

THREAD CHECKING COMPARATOR GAUGE

Georges A. J. G. Bourdelais, Wallingford, Pa., assignor, by mesne assignments, to Irene I. Bourdelais, Wallingford, Pa.

Application April 10, 1943, Serial No. 482,548

5 Claims. (Cl. 33—147)

My invention relates to comparators and to means by which standard threaded units and the specimens or products to be compared with them are supported for test purposes, handling of the standards and specimens is facilitated and accuracy is promoted.

Comparators are gauges by which standards are measured and which subsequently are used to measure specimens or products whose differences, if any, from the standard are to be determined.

The comparator may be used to test and compare many and quite different dimensions of different standards and of products which are intended to have dimensions duplicating the respective standards. However, there is considerable demand for a comparator which measures and compares the diameters at the pitch circles of threads of a standard and of specimens or products to be compared with them.

My invention is directed to this need and might be called a thread-checking comparator. It is particularly suited for checking plugs, taps and screws.

There are comparators in general use which are capable of comparing such standards and products but they depend in their operation unduly upon the human element for their operation involving corresponding inaccuracies, and are unsuited to speed in measuring a series of specimens or products.

In the operation of these prior devices, the measurements are taken between plane parallel die surfaces one of which is advanced toward the other until the simultaneous contact of the measuring faces with the work at a predetermined pressure causes an indicator connected with one of the die faces to show the distance between the faces. When applied to the threads, using a well known three wire method, standard short wires are placed in two adjacent thread grooves on one diametral side of the threaded piece, let us say the lower side—whether of standard or product—with the wires parallel to the lengths of the thread grooves and tangent to the pitch circles of the threads, and a single wire of corresponding diameter is placed within the connecting thread groove between the said two thread grooves, above and directly across the diameter of the specimen.

The test wires are of such diameter that they rest upon and are tangent to the thread groove faces at the pitch circles of the threads so that when the two wires at one side and the single wire at the opposite side are placed between the plane die surfaces of an indicating measure of caliper type the reading will always be the same for the same pitch of thread of given type and the same screw diameter.

The comparator may actually indicate (here enables the user to compare) the diameter of the pitch circle plus the radial projections of the parts of the wire thicknesses below and above the pitch circles for one standard threaded piece and these radial projections for the same threads and standard wires are always the same.

The comparator indicator may be calibrated to indicate differently according to the desire or need of the user, the actual pitch circle diameter, for example, but can be used to compare the readings—whether they have any calibrated meaning or not—of specimens or products and the reading of a selected standard.

Though this method of comparison has been used for many years and good results can be attained by it in the hands of skilled operators, it is rendered more difficult than would otherwise be the case both because of the difficulty in handling the gauge to measure the distance from wire surfaces to wire surface and at the same time properly supporting the threads which are being measured and because of the difficulty in quickly and accurately holding the three wires in their respective positions during the measuring. Workmen who are accustomed to make such measurements acquire great skill in holding the wires so that the measurement may be taken, and at the same time making the measurement.

Notwithstanding the skill attained by experts, a relatively excessive amount of time is taken by this method of manipulating the wires, the specimens and the gauge, errors occur and the method is slow as compared with operation with the present invention. Applicant's invention is intended to speed the operation and at the same time increase the degree of accuracy obtainable.

It has been found that applicant's method and mechanism make it possible for better results to be secured by untrained workers than by the skilled workers with previous mechanism and in much less time than attained by experts by the best known previous methods and mechanisms.

In the present invention, advances have been made along several lines. The upper die is the lower end of the "recording" spindle. For the greater part of the spindle length the spindle does not show and the movable part which is seen, and to which the wire-carrying cap is attached, is the upper die. For this reason, though the spinde must be raised in order to raise the upper die, reference is made generally to raising the "die" rather than to raising the spindle when the feature in mind is the elevation of the die rather than the operation by which the die is raised. Because of reference in the art to the spindle as a "recording" spindle, that term is used notwithstanding that the instrument used is an "indicator" rather than a "recorder."

The extent of elevation shown on the indicator corresponds with elevation of the spindle above its normal position but shown in elevation of the upper die above its "normal" (zero) position under conditions of use. I have therefore preferred to correlate the upper die position in space with the indicator reading, though it would be quite logical to correlate the recording spindle and the indicator reading.

The recording spindle is mounted within a sleeve which, along with an indicator support attached to it, can be lifted quickly to permit quick removal of a specimen or work piece previously tested and replacement by a new specimen or work piece to be measured in comparison with the standard.

When the sleeve is lowered the recording spindle follows with it until the upper die contacts with the work. The lower part of the spindle (the upper die as a die) supports the wire in a casing or shell effective as a wire holder, within which the wire is placed in the general position which it will occupy within the thread but with lost motion or "play" for the wire sufficient to permit it to shift laterally and align angularly with the thread surface within a small range of permissible lateral and angular movement.

The lower spindle carrying the "anvil" is preset and is fastened at a height such that the initial setting of the indicator to the measurement of a standard which is in place shows zero upon the indicator or shows a divergence from the zero of the indicator such that the indicator divergence can be matched in successive tests of specimens within any selected limits or tolerances.

The divergence of the indicator reading from zero for the measurement of the standard ordinarily makes little difference because whatever it be, the product being compared with it need be required merely to reproduce said setting within these limits of tolerance.

The support of the specimens has also been made more certain and the removal and replacement of the specimens has been facilitated.

In the setting indicated the main desideratum is, of course, accuracy; the second is speed and the third is making it possible to secure the first and second when the work is being done by unskilled labor.

All three of the above desiderata are secured by largely eliminating the human element in the operation of the mechanism.

In order to secure the results above I have had in mind various purposes or objects, one of the chief of which has been to hold the wires mechanically in proper position to engage the thread grooves, and to permit the wires to rotate.

A further purpose is to lift the upper die of a comparator by operating means which automatically holds the parts in raised position, so that conveniently and safely the specimens to be tested can be placed, removed and replaced.

A further purpose is to provide upper and lower spaced spindles terminating in dies between which measurement is to be taken, along with holders supporting the wires of a three wire system, keeping the wires close to their intended limits of use while permitting them leeway to move, preferably both laterally and angularly so that they conform to the adjacent thread groove walls.

A further purpose is to provide the upper part of a comparator with concentric spindles, together sliding into a support guide, to lift the two spindles together against tension, as by cam means and hold them in raised position automatically, while the specimens to be tested are changed, and then to allow the two spindles to come back, the one to its accustomed place and the other, because it meets the specimen, to compare the dimension of the specimen with the previously ascertained dimensions of the standard.

A further purpose is to mount a work holder having centers for the work upon bearings permitting it to be thrown into inspection position or into the identical parallel working position which previously it has assumed.

A further purpose is to support a fluted specimen such as a tap to be compared with a standard, and to hold it in position for test by a removable guide engaging within the flute.

A further purpose is to mount specimens to be tested in a comparator upon centers carried by articulated brackets so as to permit them to be thrown into and out of position for test and to snap the brackets into operating position for test by movement to a previously established limit which can be maintained as a "full stroke" movement, so as to insure accurate placing of the specimens.

A further purpose is to support specimens for comparator use upon centers carried by brackets, to spline the brackets to the same shaft for maintenance of their positions axially in line, while permitting adjustment of the distance between the centers, to rotate the shaft, and shift the shaft laterally bodily to place and replace the specimens.

A further purpose is to adjust the height of a comparator lower die (anvil) by threaded means and to hold the anvil in adjusted position by the wedge action of a tangential pinching screw.

A further purpose is to mount specimens to be tested by a comparator upon supports rotatable in vertical planes and to set the axes of the specimens in angularly adjustable planes by screw adjustments of the angular positions of the supports.

Further purposes will appear in the specifications and in the claims.

My invention relates both to methods which can be performed and to mechanism by aid of which the methods may be carried out.

I have preferred to illustrate my invention by one main form by which it can be practiced, selecting a form which is practical and effective and which facilitates quick replacement and measurement of successive specimens.

Figure 1 is a side elevation of the structure seen in other figures, showing a specimen in place but without a separate support for the specimen.

Figure 2 is a cross section of Figure 1 taken upon line 2—2 in Figure 1 and looking in the direction of the arrows.

Figure 2ª is a fragmentary enlarged view of part of Figure 2.

Figure 3 is a section of Figure 1 taken upon line 3—3 and looking in the direction of the arrows.

Figure 4 is a fragmentary section of Figure 3 taken upon line 4—4 and looking in the direction of the arrows.

Figure 5 is a fragmentary section of Figure 2 taken upon line 5—5.

Figure 7:
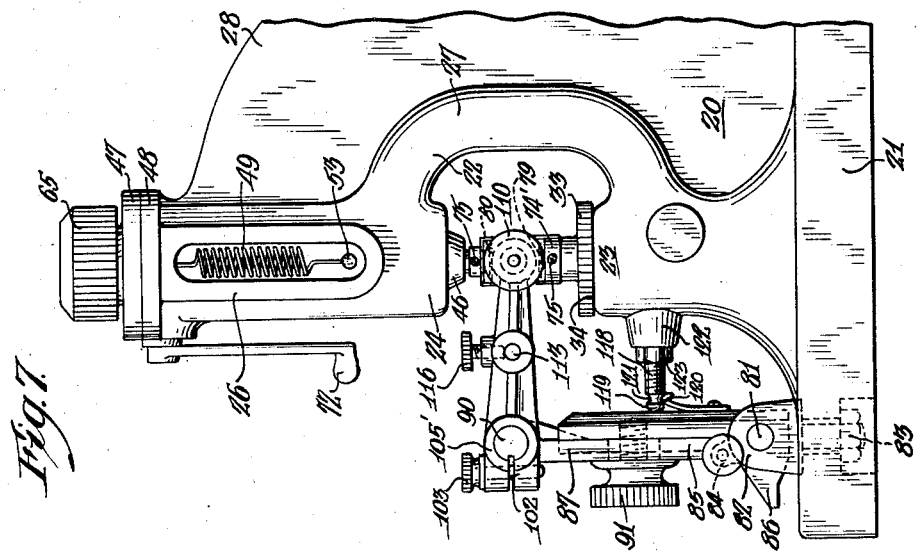
Figure 6:
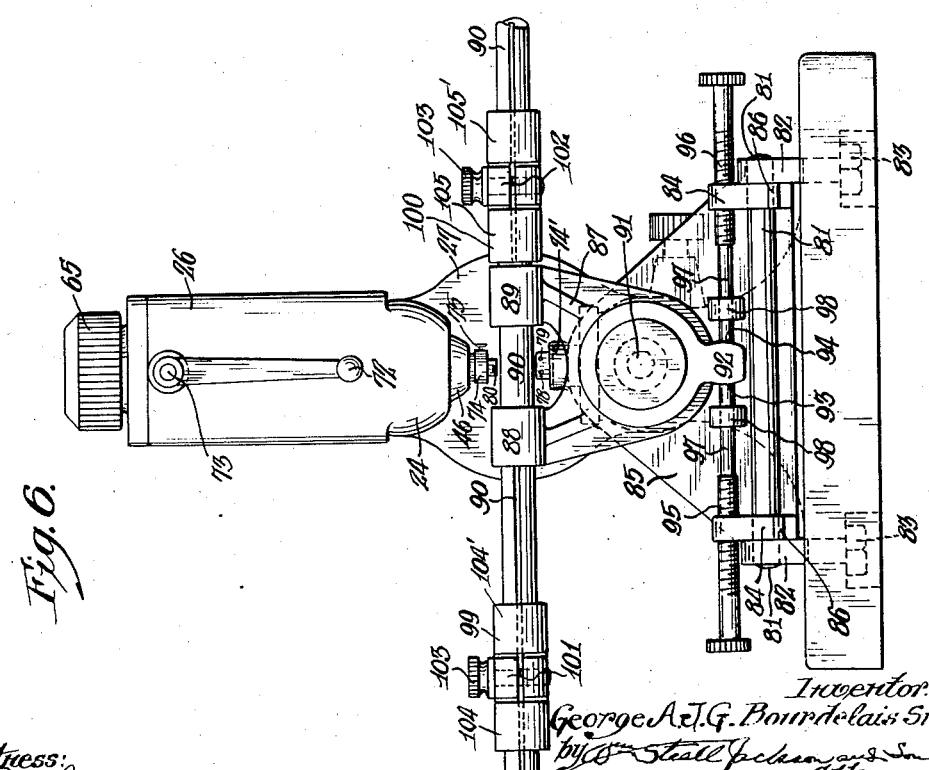

Figures 6, 7 and 8 are a front elevation, side elevation and top plan view, respectively, all fragmentary, of a comparator, in which a pair of centers is provided to carry a specimen, all involving features of my invention.

Figure 9 is a top plan view of a structure largely seen in Figure 8 but omitting the parts above the centers and breaking away part of one center.

Figures 10 and 11 are side elevations and Figures 12 and 13 are top plan views of wire holders fitting the upper and lower dies respectively and corresponding generally to those shown in Figure 2.

Figures 14 and 15 are enlarged fragmentary views showing the mounting of the ends of the wires.

In the drawings similar numerals represent like parts.

The uses for which the comparator shown is probably best suited and those upon which most of the use of this instrument has taken place are three-wire comparative tests of thread surfaces at the pitch circles including tests upon plugs and taps.

The frame 20, shown in side elevation in Figures 1 and 7, includes a base 21 and a yoke 22, having a lower die support 23 and upper die support 24. Indicator or gauge 25 surmounts a head 26. The yoke and head are stiffened and re-enforced by lateral flanges 27 and by a rib 28.

The base is vertically bored at 29 to receive plunger 30 whose upper end forms a lower die (anvil) 31. Below the anvil and from the upper end extending as far down as may be desired, the plunger (spindle) carrying the anvil is threaded at 32 to receive an adjusting nut 33 which rests upon a finished surface 34 about the spindle at the upper end of the support for the anvil.

The lower portion of the anvil spindle 30 is hollow at 35 (Figure 2) so as to house a tension spring 36. This spring is secured to the anvil spindle at 37 and to the base at 38 so as to pull the anvil spindle downwardly, taking up the slack and maintaining the anvil spindle in position, with the nut pressing upon the surface 34. A normal limit of anvil spindle position is set by the screw 39 whose head is engaged by the lower edge of the shell of the anvil spindle.

The anvil spindle is a close enough fit within the bore 29 so that there can be no play and after the plunger has been adjusted to its desired height it is locked within the bore by the tapered surface 40 of a screw 41 (see Figure 5). The screw 41 is off center with respect to the axis of the anvil spindle but bears upon the surface of the anvil spindle and gives good results when the tapered end 42 of the screw is tangent to the surface of the anvil spindle at the point of impingement and the screw length is nearly tangential to this surface, as best seen in Figure 5. The screw thus makes firm off-center wedging contact with the cylindrical surface of the anvil spindle at a point below the threaded section 32. The boss 43 provides for full thread support for the screw 41.

The upper part of the frame and the mechanism supported by it, referred to generally as the head, supply an upper die 44, means for lifting it and allowing it to lower and the gauge 25. The gauge is of well known type and indicates upon a suitable scale the height or the comparative height of the upper die (or wire carried by it) above the zero point or standard setting of the gauge. Since the comparator acts on all standards or specimens in the same manner, for convenience they will be referred to generally as specimens.

The head also sustains means for lifting the upper die and its recording supporting spindle, holding it in raised position without effort by the operator, and allowing it to lower, so as to permit insertion or substitution of a new specimen with a minimum of inconvenience and at maximum speed. Both of the operator's hands are therefore free to handle the specimens.

Above the upper die and axially in line with it, the frame is bored at 45 to receive a cylindrical sleeve 46 which is flanged at the top at 47 to rest upon shoulder 48 of the head, thus definitely limiting the downward movement of the sleeve with respect to the head. The flange 47 is normally pressed against the shoulder 48 by tension springs 49 which lie within lateral vertically extending head recesses 50.

The springs 49 are held to the flange 47 at their upper ends by tubular guides and spring supports 51, keyed by pins 52, and to the head at their lower ends within the lateral recesses by pins 53.

As thus far described the tubular guides and spring supports 51 at their upper ends fit tightly within the flanges and at their lower ends slide within the head and thus act as aligning guides to guide the sleeve flange in its movement with respect to the frame. The sleeve may thus be lifted against the tension of springs 49 and is lowered when the lifting pressure is released. It comes back each time to the same position in the head. The bearing surface is a lapped surface.

The sleeve 46 is internally bored at 54 and is counterbored from the top at 55, leaving an annular internal upwardly facing shoulder 56 (Figure 2a).

Within the inner bore 54 of the sleeve, a recording spindle 57 is free to slide vertically against the downward pressure of spring 58. It is allowed to slide up and down and at the same time is prevented from rotation by the cooperation of slot 57' and pin 57² (Figure 2).

The spring 58, (Figure 2a) at its upper end presses against a hollow threaded plug 59 screwed into the counterbore, and to place, by a screw driver fitting into the slots 60. The plug can be screwed in or out to adjust the spring pressure to meet Government requirements for gauges having different ranges. At its lower end the recording spindle carries the upper operating face which is the upper die 44. The recording spindle is headed and its under head flange surface 61 rests against the internal shoulder 56.

Above the flange 47 of the sleeve is located a tapered split collar 62 rigid in use with the internal flare 63 of externally threaded extension 64 of sleeve 46. A nut 65 engages along internally tapered surface 66 against a corresponding outwardly directed clamp surface and presses downwardly upon the tapered split clamp. The clamp is pressed down within the flare of the threaded extension so as to tighten this split clamp internally upon the shank 67 of the indicator 25. From within the indicator, downwardly projects an operating stem 68 flattened at 69, which passes through the plug 59 and through the spring 58 so that the lower end of the stem 68 engages the upper end of the spindle 57 permissibly through a ball 70.

Sleeve 46 carries the indicator. The stem of the indicator, by which the registration is effected, thus is pressed upwardly by the spindle 57 through the ball to indicate the height or the comparative height of the part of the specimen being compared. The pressure between the specimen and the indicator is thus always that of the indicator and dependence upon the "feel" of the operator is eliminated.

As thus far described, the successive specimen indications which are to be compared with the indication for a standard correspond with the successive heights of the indicator spindle when the specimens are tested, as compared with the height of the indicator spindle when a standard is tested.

For convenience of operation the sleeve 46 is lifted against the tension of springs 49 by a cam 71 conveniently shown as conventional in a cam which stays in the position in which it is put. It is seen best in Figures 3 and 4 and is rotated by a handle 72 and shaft 73. The "cam" selected to represent such a type is an eccentric. The middle of its heavy side is effective as a dwell in that pressure perpendicular to the cam surface will not shift the cam position. The cam will therefore keep the sleeve and the spindle in upper position without the cam having to be held. This frees the operator's hands so that he can handle the specimens to the best advantage.

The greatest usefulness of my comparator is in measuring the diametral distance between opposite pitch circle positions in threads, whether these threads be interrupted by flutes at intervals, as in the cases of taps, or be threads surrounding the specimen uninterruptedly as in the case of plugs.

The measurement of the distance between threads by the so-called three wire method is well known and will be described very briefly for the purpose only of indicating the novelty in the means by which I hold the wires for this three wire measurement. The wires used are standard wires of diameters suited to the threads whose pitch circle diameters are to be compared.

In the operation two wires are placed within the grooves parallel to the groove walls at the pitch circle of adjacent turns of the thread to be tested at one side of the threaded specimen, here considered as between it and the anvil, let us say. A single wire is placed between the walls of the single groove opposite, parallel to the two wires, 180° apart from them, that is on the opposite side of the threaded specimen, between the thread groove and the upper die, following the natural lead angle of the pitch and tangent to the walls at the pitch circle. The measurements taken are across from the outer lateral surfaces of the two wires, determining a plane below, to the opposite outer lateral surface of the single wire.

As at present practiced the three wires are held quite expertly in the fingers of the hand of the operator conducting the test, and the diametral distances or the comparable readings for the several tests are indicated upon the scale.

Surprisingly good results are attained by this prior art operation, considering the fact that the wires are held by hand and considering also the necessary drag on the speed of operation inserted by the inefficient mechanism for making the measurement. Nevertheless the increase in accuracy and the reduction in skill required of the operator as well as increase in speed in the use of my method and mechanism as compared with the prior art method and mechanism have been very remarkable and have made it possible to secure much more nearly uniform accuracy of result, and greater speed even with new and unskilled operators than has been possible by experienced operators with the best preceding mechanism and method.

Each of the dies, the upper and the anvil, carries a wire holder. These are shown in side elevation and top plan view respectively in Figures 10 and 12 for the upper die and in Figures 11 and 13 for the anvil. They appear in fragmentary enlarged section in Figures 14 and 15. The sections are taken parallel to the paper in Figures 12 and 13.

The wire holders include each a collar, 74 or 74' as the case may be, attached to the lower or upper die by a screw 75 or by screws 75. The collars are recessed at opposite sides, to support the walls of grooves 76, 76' in the lower holder and 77 in the upper holder. The grooves at the wire ends are covered by end caps between Figures 14 and 15 and the observer. The caps close the grooves against removal of the wires but leave the wires exposed between the ends of the wires and laterally accessible to engage the walls of the threads.

The grooves within which the wires lie are wide enough to allow lateral movement of the wires as well as slight angular movement of the wires within the holders so that the wires can move slightly sideways so as to correspond with the lateral positions of the thread grooves, and can move also angularly to follow the natural lead angle.

The adjustments above ensure bottoming of the wire sides within the threads at the pitch circle. They also add life to the wires because the wires can rotate. An attempt to use three wires united rigidly in a unit, made some time ago, was not successful and led to excessive wire wear.

Considering the specimen shown in position in Figure 2 for a test between the two wires 78 and 79 at the bottom in Figure 2 and the wire 80 at the top in the same figure, it will be apparent that the specimen will not always nor generally be in position at the start so that the upper wire is central of the upper die as it is shown, nor so that the two lower (anvil) wires will be spaced equally on opposite sides of the center of the anvil. The positions of the wires with respect to the upper and lower dies may be to the right or to the left of the positions shown in Figure 2. While the specimen can be shifted laterally by shifting any support or holder for it, as later more fully described, it is desirable that this shall not become necessary for very slight variation of wire positions from the center with respect to the wire holders. One of the functions of the wire holding grooves in Figures 14 and 15 is to take care of slight adjustments of this character.

In order that the test, standard, work piece or specimen to be measured may be handled quickly and reliably and may be placed and maintained at the time of test axially in true position parallel to the planes of the dies and with its axis crossing between the upper and lower dies directly within the common vertical axes of the upper and lower spindles, I supply a work holder by which the test piece or specimen may be supported and may be placed and replaced, and intermediately can be swung between positions for measurement and for inspection and change.

The work holder is shown in Figures 6, 7, 8 and 9. It is mounted to swing about pintle 81 between ears 82 held in place within the base 21 by bolts 83. The pintle carries fastening 84 secured to a plate 85, the fastening and plate together comprising one knuckle, joint or section of a series of knuckles, joints or sections making up what is in effect an articulated bracket.

The outward movement of the plate 85 is limited by engagement of stop 86 of the fastening with the base 21.

The plate 85 forms a seat for a yoke 87, whose opposite yoke ends form bearings 88 and 89 for a pivot shaft 90 which both slides axially of the shaft in these bearings (though this is not necessary) and turns in them. Both ends of the shaft are slotted longitudinally for splined connection with further joints or sections together making up a further part of the articulated bracket.

The yoke swings about a horizontal axis, shown as upon a screw 91 engaging the plate. The plane of separation is shown in Figure 7 as passing through the axis of shaft 90. The parts are held in adjusted position by this screw and the screw is released to permit adjustment and subsequently is tightened.

The lower end of the yoke is extended in a lug 92 so as to be impinged by the oppositely facing ends 93 and 94 of adjusting screws 95 and 96. The screws 95 and 96 are locally supported in fastenings 84 through which they are threaded and, near to their ends, their reduced portions 97 are steadied in lug bearings 98 so as to re-enforce and stiffen the screws.

Taking the parts in the position seen in Figure 6, if either of screws 95 and 96 be slacked and the other tightened the bearings for the shaft 90, and hence the shaft also, may be swung in any predetermined parallel planes, shown as vertical, in clockwise or counterclockwise direction. This is normally used for the purpose of levelling the shaft so that the work axis will be parallel to the planes of the die surfaces, but could be used in order to give the shaft axis any degree of slant or slope that may be desired for special testing.

As thus far described, shaft 90 can be adjusted parallel to the plane of the paper in Figure 6 by screws 95 and 96 but can be rocked about pintle 81 toward and from the observer in the same figure.

To right and left of the upper and lower dies as seen in Figure 6, work-holding centers are supported on brackets 99 and 100 which are clamped to the shaft by split jaws 101 and 102 seen best in Figures 6 and 7. These are tightened by screws 103.

Each bracket, in addition to a gripping jaw, 101 or 102, carries a guide 104, 105 which surrounds the shaft and is splined to it to prevent rotation of the brackets about the shaft. For balance, and as a matter of good design, each clamping jaw, 101 or 102, is placed between two such splined guides 104, 104' of brackets 99 or 105, 105' of bracket 100.

When the shaft 90 swings in its bearings or slides axially in them it carries the brackets and their centers with it. Axial movement in the bearings permits adjustment of the specimen after the specimen has been mounted in the centers, but this adjustment can be given by separate movement of the brackets upon the shaft. The fact that the shaft is splined in Figure 6 to right and left of the bearings does not indicate that the shaft cannot move freely through the bearings to right or left to points such that the splining slot lies within the bearings. Evidently the slot could be carried clear through.

Alternative means of making an adjustment is offered; but whether the longitudinal adjustment be made by setting the brackets in the proper positions with respect to the length of the specimens and the upper and lower die faces independently or by mounting the specimens between the centers and then sliding the shaft until the appropriate portion of the specimen is located in the intended position between the dies need make no difference in carrying out my invention and is a matter therefore of convenience, contributing, however, to speed of operation.

The centers 106, 107 swing together and are always in axial line, the one center with the other, to whatever adjustment of spacing axially of the work they have been set.

Both centers, 106 and 107, are dead centers in the sense that there is no "live" driving center provided, and that they merely support the work so that it can be turned upon them. Either center or both may be axially yieldable in the sense that it is axially spring urged and can be pulled out against the compression of a spring. This permits insertion of a specimen. For convenience the right hand center in Figure 9 has been so shown. It is pressed to position by a spring 108 pushing against a plug 109 by which the center is carried. The plug is restrained against removal by nut 110.

Some of the specimens to be tested are taps having usually four chip-clearing flutes. To compare with a standard the successive taps tested must be set in corresponding angular positions with respect to these flutes. In order to take care of this setting, I mount a flute guide 111 in such position that it will engage within an adjacent flute of the tap after each setting. The support 112 for the guide is carried by a rod 113 which slides within a sleeve 114 upon one of the brackets. Screws 115 and 116 hold the parts in set position.

When the articulated bracket has been set in position so that the specimen registers properly between the upper and lower dies, screw 118 is set so that its head 119 engages the back of the lower section of the articulated bracket as a stop and latch 120 fits within groove 121 to establish full stroke setting and to prevent accidental release of the parts. Screw 118 threads into boss 122 and is locked by nut 123.

In operation: Let us assume that the comparator is empty and that it is the intention to compare a series of threaded specimens with a threaded standard. The upper die has been raised, the screw 41 has been released, and the various adjustments of the test apparatus are released.

The threaded standard is put in position between the centers and brackets 99 and 100 are placed on opposite sides of the bearings for shaft 90 in position which from experience the operator knows will bring the part of the thread to be compared to the middle—right and left in Figure 6—of the spaces between the upper and lower dies.

If the shaft 90 be not horizontal it is tilted until it is horizontal and the lower bracket is clamped in position to hold it so. The articulated brackets are then swung into position until the thread is in the middle of the space over the lower die. The position (right and left in Figure 7) is set by adjusting the position of the stop screw 118 so that the articulated bracket will be brought to correct position at each inward movement.

The three wires used must, of course, be appropriate to the pitch and type of thread used in the standard and these wires must be mounted upon the upper and lower dies.

If the portion of thread with which comparison is to be made is not in proper position—Figure 6—lengthwise of the shaft 90, this must be adjusted by sliding the shaft or by sliding the brackets.

After the adjustment lengthwise has been made the upper spindle is lowered upon the work and the lower or anvil spindle is raised by turning its nut until the indicator shows an indication with all three wires in position. If it be the intention to set the indicator to zero, the lower die will be lowered until the zero setting is secured after which the plunger carrying the lower die will be clamped in position by screw 41. The bracket clamps upon shaft 90 are tightened. If the part be fluted the flute guide must be put in position to determine and subsequently to maintain the same angular position of the specimens as occupied by the standard.

The head is now lifted, the articulated bracket carrying the standard is moved counterclockwise in Figure 7 to bring the centers in position where the standard can be released and a specimen put in its place, the parts are thrown back to position between the spindles and the upper spindle is lowered to give the required reading. If the standard and specimens be fluted pieces, the flute guide does not need to be touched, the standard is removed from between the centers moving it in direction away from the flute guide and a specimen is put in place of the standard and fitted against the flute guide automatically as it fits between the centers.

After the fluted article has been placed between the centers in proper relation to the flute guide, the brackets are turned clockwise in Figure 7 bringing the specimen into position to rest upon the wires upon the lower die, the upper die is lowered and a new reading is taken. This operation is repeated for each specimen.

It will be evident that the indicator need not be set to zero at any time but may be set to any convenient point within its range of indication and the comparison of the specimens with the standard may then be made upon the basis of the approach with each specimen to the same reading as that for the standard.

After the comparator has been set for a standard the operator tests a specimen, lifts the upper spindle, shifts the bracket so that the specimen is accessible, removes the specimen from between the centers, immediately replaces by another specimen, returns the bracket to bring the specimen back to position, lowers the upper spindle and takes another reading, watching to see if it be within the limits of error set and putting it down if individual records of the specimens are desired. Reading the indicator takes the place of the exercise of judgment, and mechanical support takes the place of hand support and adjustment.

Obviously other means may be used for lifting the upper die and of maintaining it automatically in lifted position while obtaining part of the advantage of the invention. The operator may have both hands free for changing specimens.

It will be evident that the specimen may be adjusted true to the anvil or lower die, which allows a visual check by the dial as to the accuracy of alignment; and that the delicacy of comparison of the standard and specimen is limited only by the delicacy of reading of the indicator, which in practice reliably indicates changes of a ten-thousandths of an inch.

The holder is flexible in all directions, is thoroughly adjustable and will take various sizes of plugs, gauges and taps. All the adjustable parts can be locked after the adjustments have been made.

It will be clear that the wire holder, allowing play for the wires, permits the wires to take the natural lead angle of the pitch of the threads being compared.

The extent of lifting of the plunger carrying the lower die or anvil determines the range of diameters of specimens which can be handled, permitting a particularly wide range.

The flutes in the taps permit a visual check of the neutral point or zero point on the dial when the upper die is down.

The spring pressure upon the upper die gives uniform effects with all specimens and overcomes dependence upon the human factor of "feel."

In view of my invention and disclosure variations and modifications to meet individual whim or particular need will doubtless become evident to others skilled in the art, to obtain all or part of the benefits of my invention without copying the structure shown.

Having thus described my invention what I claim as new and desire to secure by Letters Patent is:

1. In a comparator, a frame, upper and lower dies, a threaded support for adjusting the height of the lower die, a movable spindle supporting the upper die and having a downwardly directed shoulder at its upper end, a sleeve engaging the shoulder from below and guided for vertical movement within the frame, means engaging the sleeve to lift it and thereby to lift the spindle, said means having provision to hold the spindle in raised position, an indicator supported by the sleeve and having the operating mechanism of the indicator engaging the spindle, whereby the indicator sleeve and spindle are lifted without changing the indication but relative movement of the spindle and sleeve shows on the indicator.

2. In a comparator, a head, an upper die, a spindle carrying the upper die, a sleeve vertically movable in the head and adapted to lift the spindle, an indicator connected to said sleeve to move therewith and upon which the extent of lift of the spindle above the sleeve is shown, a flange upon the sleeve, spring means for normally holding the flange down to the head and opposing upward movement thereof, a spring restraining relative movement between the sleeve and the spindle, a flange on the spindle limiting downward movement of the spindle within the sleeve and means for lifting the sleeve with respect to the head and against the urge of the spring, whereby the spindle and sleeve can be lifted together and held in lifted position to permit substitution of a new specimen to be compared and, when released, the failure of the spindle to follow the sleeve down fully because of the presence of the new specimen is shown as a reading upon the indicator.

3. In a comparator, a head, an upper die, a spindle carrying the upper die, a sleeve vertically movable in the head and adapted to lift the spindle, an indicator connected to said sleeve to move therewith and upon which the extent of lift of the spindle above the sleeve is shown, a flange upon the sleeve, spring means for normally holding the flange down to the head and opposing upward movement thereof, a spring restraining relative movement between the sleeve and the spindle, a flange on the spindle limiting downward movement of the spindle within the sleeve and self-holding means for lifting the sleeve with respect to the head and against the urge of the spring, whereby the spindle and sleeve can be lifted together and held in lifted position to permit substitution of a new specimen to be compared and, when released, the failure of the spindle to follow the sleeve down fully because of the presence of the new specimen is shown as a reading upon the indicator.

4. In a comparator, a comparator frame having a vertical bore, a lower or anvil spindle within the bore, having an exterior thread upon the upper part of the spindle and an unthreaded cylindrical surface below the thread, and hollow at the lower part of the spindle, a spring within the hollow adapted to pull the spindle downwardly, a nut engaging the thread upon the spindle, bearing upon the frame about the thread and adapted to raise the spindle when the nut is turned or allow it to be retracted by the spring and a screw within the frame engaging the smooth part of the spindle in a direction of screw travel more nearly tangential than radial to the surface of the spindle below the thread.

5. In a comparator, a comparator frame vertically bored for a lower spindle, a lower threaded spindle in the bore, a lower die on the spindle, a spring tending to retract the lower spindle within the frame, means for lifting the lower spindle against the action of the spring, a screw engaging the surface of the spindle below the threads thereof at a screw direction more nearly tangential than radial to the surface of the spindle and a tapered impinging point on the screw generally tangential to the surface of the lower spindle.

GEORGES A. J. G. BOURDELAIS.

REFERENCES CITED

The following references are of record in the file of this patent:

UNITED STATES PATENTS

| Number | Name | Date |
|---|---|---|
| 1,238,714 | Miller | Aug. 28, 1917 |
| 1,351,663 | Koch | Aug. 31, 1920 |
| 1,480,611 | Hill | June 15, 1924 |

FOREIGN PATENTS

| Number | Country | Date |
|---|---|---|
| 470,246 | Great Britain | Aug. 11, 1937 |
| 216,443 | Switzerland | Aug. 31, 1941 |